United States Patent [19]

Shenk

[11] 4,049,013
[45] Sept. 20, 1977

[54] SEWAGE SYSTEM

[76] Inventor: William Shenk, 8118 Oakleigh Road, Baltimore, Md. 21234

[21] Appl. No.: 734,725

[22] Filed: Oct. 22, 1976

[51] Int. Cl.² .............................................. F17C 3/00
[52] U.S. Cl. .................................. 137/263; 137/265; 137/266; 137/363; 137/567; 137/572; 137/574; 137/576
[58] Field of Search ............... 137/265, 262, 259, 264, 137/266, 363, 364, 572, 574, 576, 567; 210/542, 258, 294

[56] References Cited

U.S. PATENT DOCUMENTS

| | | | |
|---|---|---|---|
| 714,801 | 12/1902 | Killon | 137/256 X |
| 940,402 | 11/1909 | Patterson | 137/256 X |
| 1,080,547 | 12/1913 | Gamble | 137/265 X |
| 1,208,373 | 12/1916 | Rhodes | 137/262 |
| 1,609,830 | 12/1926 | Pruss | 210/294 |
| 1,975,109 | 10/1934 | Laughlin | 210/735 |
| 2,027,370 | 1/1936 | Currie | 210/259 X |
| 2,132,837 | 10/1938 | Talbot | 210/542 X |
| 2,186,371 | 1/1940 | Talbot | 210/542 X |
| 2,430,519 | 11/1947 | Mallory | 210/258 X |
| 2,653,129 | 9/1953 | Nebolsine | 137/265 X |
| 2,789,090 | 4/1957 | Guillerd | 137/256 X |
| 3,053,390 | 11/1962 | Wood | 210/258 X |
| 3,396,102 | 8/1968 | Forrest | 210/259 X |

Primary Examiner—Alan Cohan

[57] ABSTRACT

A sewage system having a central drywell pump room surrounded by a circular-segment well system comprising first and second wet wells and a third or overflow retention well. System-intake is into a distribution chamber located at a segment-well separating the first and second wet wells and having sluice gates for normal-operation diversion into either of these wet wells and provision for emergency overflow into both these wells; the third well connects with the first and second wet wells by means of an overflow port located at a level higher than the distribution chamber and by means of a primary drain line and a secondary drain line; a station overflow pipe in the third well higher than the overflow port provides the ultimate emergency relief; pumps in the pump room provide discharge connection in parallel, with a first pump for reducing the first wet well level, a second pump for reducing either wet-well level or both simultaneously, and a third pump for reducing the second wet well level; sluice gates provide interconnection between the wet wells; the dry-well rises within an isolating wall to a capping deck having a superstructure above sheltering pump motors for the pumps; manholes and access ladders and platforms permit inspection and special operation of the wet wells and overflow retention well.

12 Claims, 3 Drawing Figures

SEWAGE SYSTEM

Cross reference is made to my copending U.S. application Ser. No. 528,359, filed Nov. 29, 1974 for SHEILL PUMPING STATION, which upon the filing of the present application became abandoned.

This invention relates generally to material handling and specifically to temporary accumulation and pumping of sewage.

Many of our streams and waterways are polluted by the overflow or discharge of raw sewage from pumping stations during times of electrical power outage and maintenance shutdowns. Because of the possibility of occasional electrical power outage, usually of short duration, pumping stations are made larger and more expensive to include standby electrical generators. At times when the standby generators in the pumping stations are not tested and maintained properly they fail to function when they are required to furnish power.

Among principal objects of the invention are those of overcoming the above drawbacks and providing a system having an annular end-abutting well series concentrically disposed around a dry-well pumping installation for more reliable, more flexible and more economical sewage systems.

In the prior art various circular structures have been disclosed including those of the following U.S. Pat. Nos.:

1,208,378 to C. E. Rhodes, 12-12-16; 1,609,830 to M. Pruss, 12-7-26; 1,975,109 to W. C. Laughlin et al., 10-2-34; 2,027,370 to F. S. Currie, 1-14-36; 2,132,837 to H. J. Talbot, 10-11-38; 2,186,371 to A. C. Durdin, Jr., 1-9-40; 2,430,519 to E. B. Mallory, 11-11-47; 2,723,760 to H. J. Talbot, 11-15-55; 2,789,090 to J. Guillerd et al., 4-16-57; 3,053,390 to F. J. Wood, 9-11-52; 3,396,102 to T. H. Forrest, 4-6-68.

However, none of the above discloses Applicant's inventive system as set forth herein or the operation and results provided according to objects of the invention.

Other objects are to provide a system minimizing construction cost and space required in a sewage accumulator/transfer system having optimum failsafe, successive fallback provisions affording maximum efficiency in both emergency and normal operations and reducing or eliminating need for standby emergency power plants, to provide a system which is easily monitored and operated, easily cleaned and maintained, which offers centralized security, shelter, and access which protects the pumping installation from extreme temperatures, which is easily and positively ventilatable, which permits selective access for inspection and repair without interruption of normal operation, which can be constructed of concrete or of steel at less than conventional pumping station costs, which will operate with fewer pump starts and which will reduce environmental pollution.

In brief summary given for cursive descriptive purposes only the invention includes an annular array of end-abutted wells surrounding a dry well having associated pumping and valving means associated therewith, the end-abutted wells affording a power-failure automatic flow sequence flexibly predeterminable in part.

The above and other objects and advantages of the invention will become more readily apparent on examination of the following description, including the drawings, in which.

STRUCTURE

Figure 1:
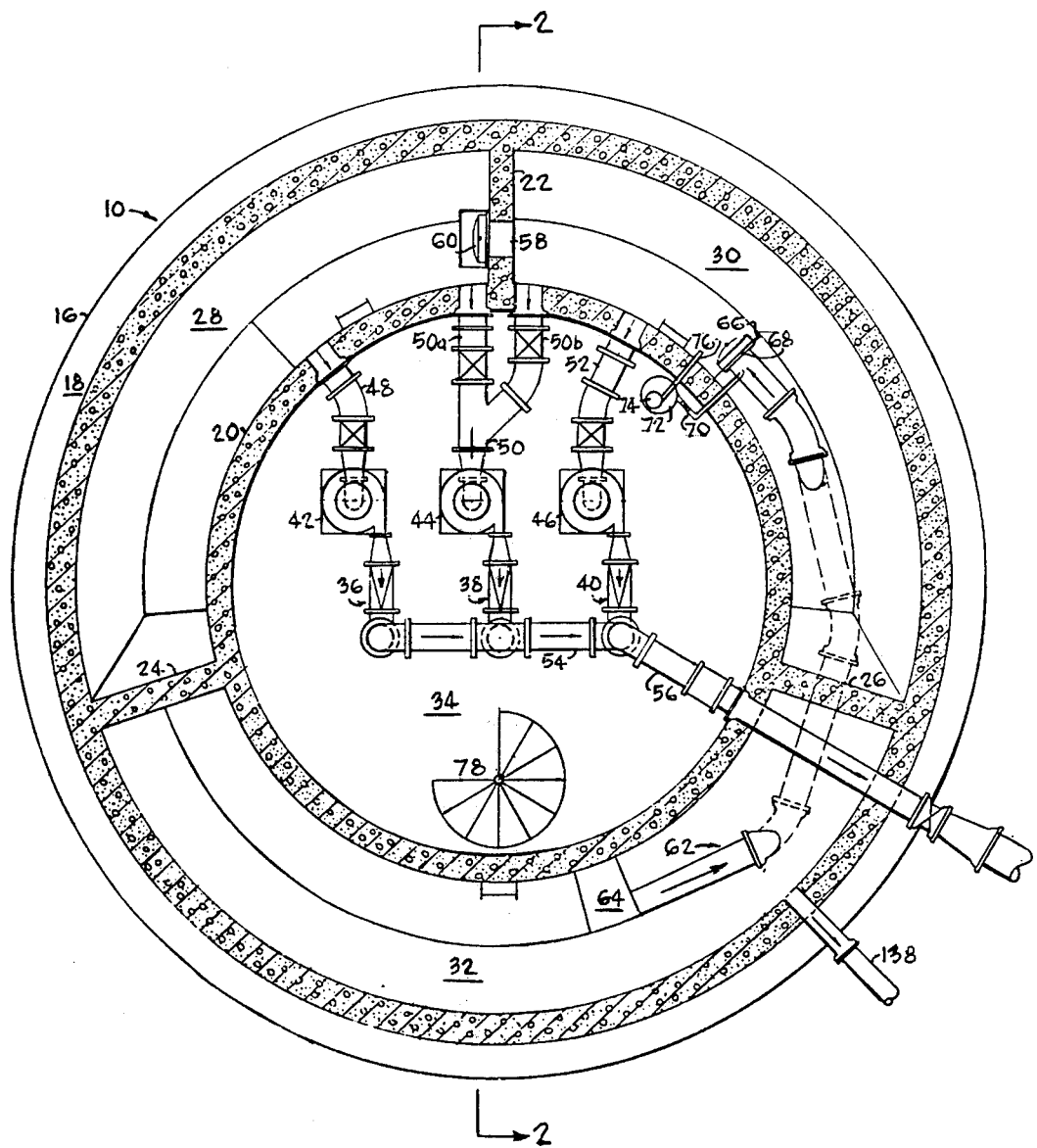
FIG. 1 is a plan view in partial section taken at 1—1, FIG. 2.

FIG. 1 shows the sectional plan of the lower part of the invention 10 which includes a circular base or foundation 16 underlying the outer 18 and inner 20 concentric cylindrical walls joined at regular intervals by three radial walls 22, 24, 26, the whole defining three end-abutted wells 28, 30, 32, two wet wells and an overflow retention well respectively, forming an annulus surrounding but isolated from a centrally located dry well 34, except for sealed pumping provisions.

As will be described in reference to the next Figure, sewage enters the wet well system at a point above radial wall 22 through means providing normal distribution to either of the adjacent wet wells or to both simultaneously.

Three discharge pumping systems 36, 38, 40, have respective pumps 42, 44, 46, each of which has a respective intake system 48, 50, 52, the first of which has drain connection with wet well 28, the second of which at 50a and 50b has drain connection respectively with wet well 28 and wet well 30, and the last of which has drain connection with overflow retention well 32, together with the second at 50b.

All three pumps discharge through a header 54 into discharge line 56 passing from the station.

For reasons to be described, a sluice gate 60 having at an opening 58 connects wet wells 28 and 30 at the drainage level; similarly a pipe 62 at one end connects the lowest point 64 in overflow retention well 32 with a corresponding location 66 in wet well 30, at which end the pipe has a shut off valve 68 and a flushing-drain line 70 to a sump 72 in the dry well provided with a sump pump 74 and discharge line 76 into wet well 30.

A circular stairway 78 provides access to the dry well from above.

Station overflow 138 is described later.

Figure 2:
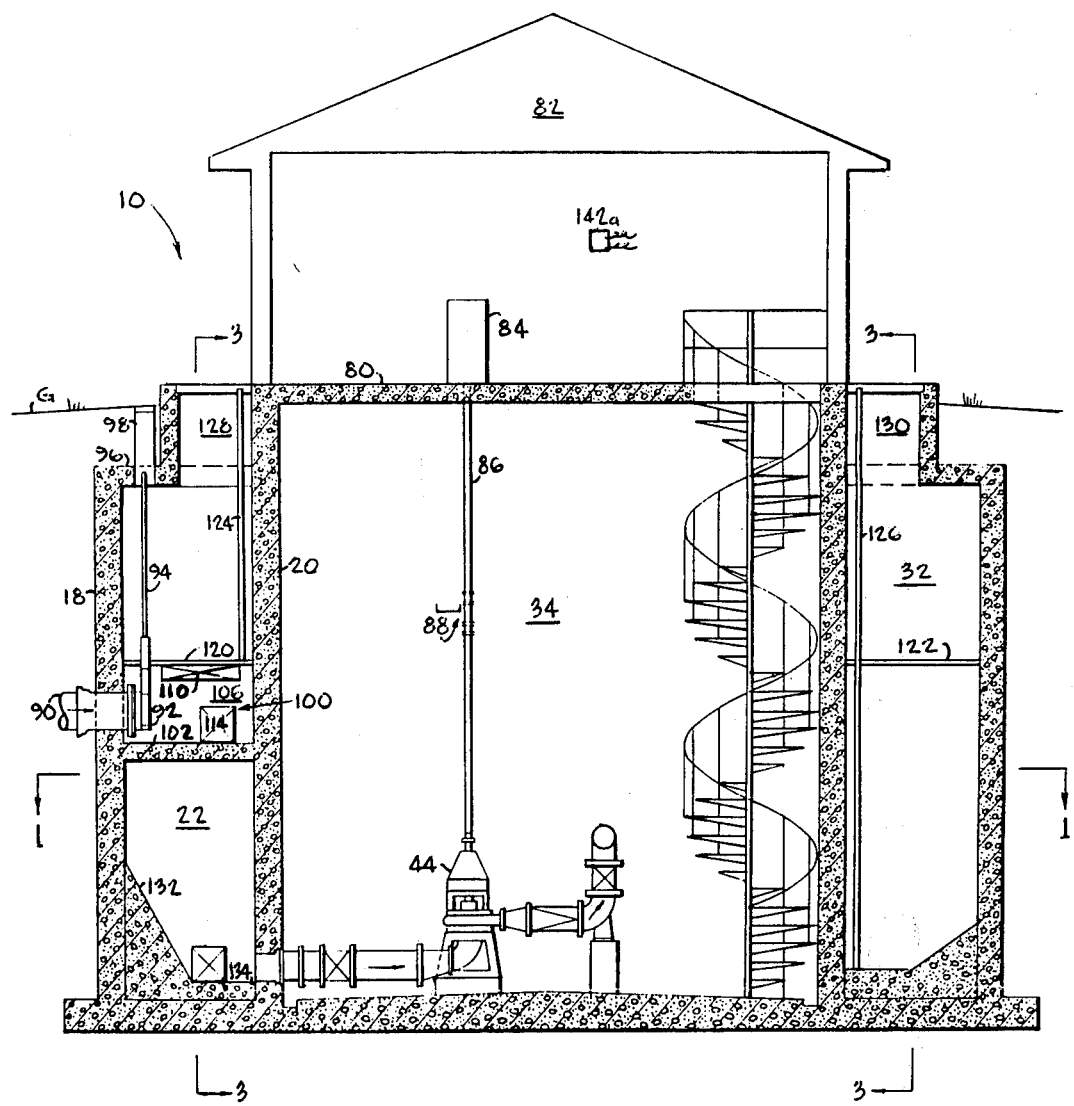
FIG. 2 is a side elevational view in partial section taken at 2—2, FIG. 1.

FIG. 2 shows the circular stairway passing through the overhead 80 of dry well 34 from a preferably dwelling-like super-structure 82 above ground level G, which houses the electrical controls 142 and the pump motors, 84 shown, and rests preferably on the inner wall 20. The pump motors are fixed in protected position in the superstructure on the floor formed by the dry well overhead 80. Respective vertical driveshafts 86, shown, preferably having intermediate supporting journals 88, drive the pumps (44 shown).

Sewage enters the system halfway up the wet wall height through an influent line 90 having a shut off valve 92 controllable from above by means of valve stem 94 which passes up through the wet-well overhead 96 to a valve box 98 at ground level.

Entering sewage spills into a wet well distribution chamber 100 having a floor 102 resting on radial wall 22 and having a pair of opposed sides 104, 106 (one shown) forming an open-top trough bounded on the other two sides by the outer and inner cylindrical walls 18, 20.

Each side has along the top a spillover recess 108, 110 (one shown) and below that adjacent the floor of the distribution chamber a sluice gate 112, 114 (one shown) each equipped with a valve-operator 116, 118 (shown in the next Figure).

A catwalk 120 rests on top of the sides of the wet well distribution chamber and passes around the wet wells 28, 30, (other two Figures) a distance giving valve-control operation, access and inspection and flush-down access; a similar platform 122 is in overflow retention well 32. Vertical ladders 124, 126 give access from manholes 128, 130 respectively to the catwalks and to the bottoms of the wells. The manholes and ladders lead down proximate the inner wall 20 for compactness and for safety because of bottom contour of the wells.

The bottoms of the wells are typical of all three wells, having portions 132 sloping sharply down and inward from the outer walls permitting ready drain and flush down and having portions 134 sloping to a low point intermediate the length of each well. Control 142a is referred to later, also.

Figure 3:
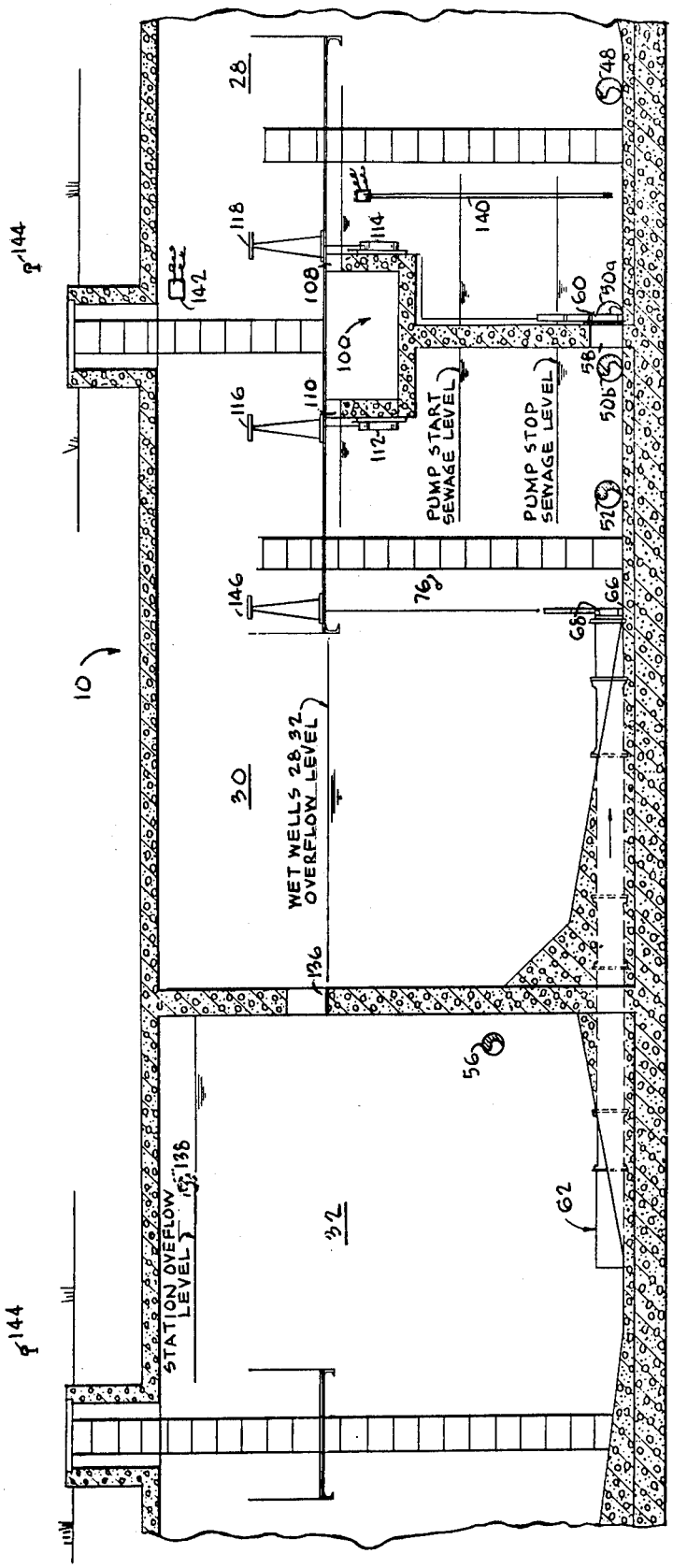
FIG. 3 is a developed elevational view in partial section taken at 3—3, FIG. 2.

FIG. 3 shows the general elevational relation of the wells to each other and to elements and parameters of the system.

The wet well distribution chamber spillover recesses 108, 110 lie below the level of wet well overflow port 136 (there may be more than one) leading through one or both radial walls to overflow retention well 32. In well 32 near the overhead and much higher than the overflow port, the catwalk, and the valve controls (e.g. 146) of the other wells, station overflow pipe 138 (phantom lines) passes through the outer wall to spill into the ambient under conditions to be described.

One or more conventional level sensors 140 control the operation of the pumps. Controls 142 (and 142a, previous Figure) provide means for selection of which pump or pumps are to be operative at any particular time. Hose bibs 144 provide means for flushdown of the system.

NORMAL OPERATION

Essentially this system functions as a ballast or capacitance in the sewer line in which employed.

Wet wells 28 and 30 are used in normal operation.

The level sensors turn on the preselected one or more of the pumps at PUMP START SEWAGE LEVEL, which is about halfway up to the catwalk and below the influent line 90 (FIG. 2) and the sump pump discharge line 76, and turn off the pumps at PUMP STOP SEWAGE LEVEL which is safely above the pump intakes 48, 50a, 50b, 52.

Time is of the essence in normal operation, the maximum period during which a mass of sewage can be stored before it begins to turn septic with resultant solidification of parts of the mass and clogging and adherent tendencies being relatively short. System capacity is chosen with this in mind and the present invention can be adapted in construction size to suit differing volume and flow requirements more easily, quickly and economically than perhaps any other system.

Pump intakes are short and spaced for efficient circulation in the wet wells which are the wells normally employed. Either of these wells can be used separately, or they can be used alternately, or both can be used together for maximum influx periods. Wear on the pumps can be controlled according to best practice, the standby central pump being employable in conjunction with the sluice gate 58 to discharge either of these two wells.

EMERGENCY OPERATION

When power to the pumps fails, very important design aspects of this invention will become evident. No matter what the status of the valving elements and pumping elements, failsafe operation is assured to the maximum capacity of the system and in least-disturbance order.

First, assuming that only one of the two wet wells is in use. That wet well will fill and only then will the excess sewage spill over into the other wet well.

The catwalk, and valve controls above it, will remain in safe operational dry condition.

Only when both the normal-operation wet wells are full will the excess sewage spill over into overflow retention well 32, and the catwalk and controls will remain dry until this well fills.

Finally, when the overflow retention well is filled to the wet well overflow port, the system automatically commences filling the operator working space and continues to use this space as a further reserve capacity until finally the undesired but necessary station overflow level is reached.

Thus in successive fallbacks the various volumes of the system are serially and automatically employed in order of decreasing desirability until full capacity is reached.

Clean up may be by pumping down the level until one of the normal operation wet wells is cleared and flushed down, following which that one wet well can be employed, using two pumps, until a more leisurely cleanup of the other normal operation wet well is made. Following this, the third well can be cleared through drainpipe 62 and the line flushed and drained through the sump system.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by United States Letters Patent is:

1. In a sewage station having circular means for receiving sewage and pumping means powered for discharging sewage from the receiving means, the improvement comprising: the means for receiving including structure defining: a drywell, a plurality of wells in annular array around the drywell, means for power-free distribution of sewage in predeterminable sequence among portions of the plurality of wells, and means for selectively delivering sewage to the pumping means from the plurality of wells in predeterminable sequence.

2. In a sewage station as recited in claim 1, said structure defining including: a base, a cylindrical inner wall forming said drywell above the base, a cylindrical outer wall coaxial with said inner wall and forming an annular space therebetween above the base, a plurality of radial walls joining the inner wall and the outer wall for dividing said annular space into said plurality of wells.

3. In a sewage station as recited in claim 2, overhead structure having access therethrough closing the top of all said drywell and plurality of wells.

4. In a sewage station as recited in claim 2, the means for power-free distribution including: said plurality of wells comprising at least three wells, a first of said radial walls in the annular space separating a first well from a second well of said plurality of wells, second and third of said radial walls respectively separating a third well from the respective first well and the second well, first means for the first wall at an intermediate level in the annular space for directing incoming sewage simultaneously to the first well and to the second well, and means for conducting sewage into the third well when sewage has filled the first well and the second well past the level of the first means.

5. In a sewage station as recited in claim 4, said pumping means including a plurality of pumps in the drywell, the means for selectively delivering including intake connection through the inner wall from said first and second wells to respective of said plurality of pumps, means for discharging from said plurality of pumps, a drain pipe connecting a lower portion of the third well with at least one of said first and second wells for draining the third well, and a platform for supporting workmen and the like in a space over said distribution chamber.

6. In a sewage station as recited in claim 5, means in one of said wells for passing sewage outside said sewage station when sewage has substantially filled the space over said platform, thereby employing said space for workmen and the like as last-reserve capacity for sewage in said sewage station.

7. In a sewage station as recited in claim 6, respective valving means associated with at least one of said plurality of pumps, drain pipe and distribution chamber, control means on the platform for said valving means, means for flushing said drainpipe, and said means for passing sewage outside the sewage station including an opening in the third well adjacent the top of said annular space.

8. In a sewage station as recited in claim 5, said plurality of pumps including first, second, and third pumps, said intake connection including connection of the first pump with the first well, connection of the second pump with the first and the second wells, and connection of the third pump with the third well.

9. In a sewage station as recited in claim 8, the first radial wall having a valve connection through the base thereof for selectively communicating between the first well and the second well and isolating the first well and the second well.

10. In a sewage station as recited in claim 8, means for pump-starting at a first predesignated level of sewage, means for pump-stopping at a second predesignated level of sewage, and means for selecting which of said plurality of pumps is to be used at a particular time.

11. In a sewage station as recited in claim 6, second means on the first wall below the first means, for routing sewage to the first well, and third means on the first wall below the first means, for routing sewage to the second well.

12. In a sewage station as recited in claim 11, a shelter-type superstructure over the overhead of the drywell, at least one pump motor in the superstructure, and means operably connecting said at least one pump motor to one of said pumps in the drywell.

* * * * *